United States Patent
Yip et al.

(10) Patent No.: US 11,711,550 B2
(45) Date of Patent: Jul. 25, 2023

(54) METHOD AND APPARATUS FOR SUPPORTING TELECONFERENCING AND TELEPRESENCE CONTAINING MULTIPLE 360 DEGREE VIDEOS

(71) Applicant: Samsung Electronics Co., Ltd., Suwon-si (KR)

(72) Inventors: Eric Yip, Suwon-si (KR); Jaeyeon Song, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/708,535

(22) Filed: Mar. 30, 2022

(65) Prior Publication Data

US 2022/0321926 A1      Oct. 6, 2022

(30) Foreign Application Priority Data

Mar. 30, 2021   (KR) ........................ 10-2021-0041400

(51) Int. Cl.
*H04N 21/218* (2011.01)
*H04L 65/10* (2022.01)
(Continued)

(52) U.S. Cl.
CPC ....... *H04N 21/21805* (2013.01); *H04L 65/10* (2013.01); *H04L 65/1063* (2013.01);
(Continued)

(58) Field of Classification Search
CPC ... H04L 65/10; H04L 65/403; H04L 65/1104; H04L 65/1063; H04N 21/21805; H04N 21/6437
See application file for complete search history.

(56) References Cited

U.S. PATENT DOCUMENTS

| 7,953,867 B1 | 5/2011 | Andreasen |
| 2014/0049603 A1 | 2/2014 | Wang et al. |
| (Continued) | | |

FOREIGN PATENT DOCUMENTS

WO      2020/234373 A1    11/2020

OTHER PUBLICATIONS

International Search Report and Written Opinion dated Jun. 28, 2022, issued in International Patent Application No. PCT/KR2022/004480.

*Primary Examiner* — Frantz B Jean
(74) *Attorney, Agent, or Firm* — Jefferson IP Law, LLP

(57) ABSTRACT

The disclosure relates to a 5th Generation (5G) or 6th Generation (6G) communication system for supporting a higher data transmission rate. The method of a first entity performing a media resource function (MRF) includes transmitting, to a second entity, a session description protocol (SDP) offer message for an SDP negotiation associated with a conference providing a plurality of 360-degree videos, and receiving, from the second entity, an SDP answer message. Wherein the SDP offer message includes a plurality of media descriptions for the plurality of 360-degree videos, and wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

20 Claims, 15 Drawing Sheets

(51) Int. Cl.
*H04N 21/6437* (2011.01)
*H04L 65/403* (2022.01)
*H04L 65/1104* (2022.01)
*H04L 65/1063* (2022.01)

(52) U.S. Cl.
CPC ........ *H04L 65/1104* (2022.05); *H04L 65/403* (2013.01); *H04N 21/6437* (2013.01)

(56) References Cited

U.S. PATENT DOCUMENTS

| | | |
|---|---|---|
| 2019/0104326 A1 | 4/2019 | Stockhammer et al. |
| 2021/0029326 A1 | 1/2021 | Oyman et al. |
| 2021/0120066 A1* | 4/2021 | Oyman .................. H04L 67/14 |
| 2022/0174108 A1* | 6/2022 | Oyman ............... H04L 65/1069 |
| 2023/0012201 A1* | 1/2023 | Ahsan ............ H04N 21/440245 |

* cited by examiner

| 0 | | | | 31 |
|---|---|---|---|---|
| V | P | SUBTYPE | PT | LENGTH |
| SSRC OF PACKET SOURCE ||||| 
| SSRC OF MEDIA SOURCE |||||
| EXP || MANTISSA || MEASURED OVERHEAD |

310    320

```
SDP offer
/*1st conference room of A*/
m=video 49144 RTP/AVP 98 100
a=tcap:1 RTP/AVPF
a=pcfg:1 t=1
b=AS:950
b=RS:0
b=RR:5000
a=content:main /*indicates this m-line is from the main
source from the conference location*/
a=rtpmap:98 H265/90000 /*360 video*/
a=3gpp_360video:98...
a=rtpmap:100 H265/90000 /*2D video*/

/*2nd conference room of A*/
m=video 49154 RTP/AVP 102 104
a=tcap:1 RTP/AVPF
a=pcfg:1 t=1
b=AS:950
b=RS:0
b=RR:5000
a=content:alt /*indicates this m-line is from an alt source from the conference location*/
a=rtpmap:102 H265/90000 /*360 video*/
a=3gpp_360video:102...
a=rtpmap:104 H265/90000 /*2D video*/

/*capture of B*/
m=video 49164 RTP/AVP 106 108
a=tcap:1 RTP/AVPF
a=pcfg:1 t=1
b=AS:950
b=RS:0
b=RR:5000
a=rtpmap:106 H265/90000 /*2D video*/
a=rtpmap:108 H265/90000 /*3D video*/
a=3gpp_360video:108...
```

FIG.9

```
SDP offer
a=itt4rt_group: X Y Z /*create group between media of different entities at MRF/

/*1st conference room of A*/
m=video 49144 RTP/AVP 98 100
a=tcap:1 RTP/AVPF
a=pcfg:1 t=1
b=AS:950
b=RS:0
b=RR:5000
a=content:main /*indicates this m-line is from the main
source from the conference location*/
a=rtpmap:98 H265/90000 /*360 video*/
a=3gpp_360video:98...
a=rtpmap:100 H265/90000 /*2D video*/
a=3gpp_overlay:100... /*optional attribute*/
a=mid=X /*2nd conference room of A*/
m=video 49154 RTP/AVP 102 104
a=tcap:1 RTP/AVPF
a=pcfg:1 t=1
b=AS:950
b=RS:0
b=RR:5000
a=content:alt /*indicates this m-line is from an alt source from the conference location*/
a=rtpmap:102 H265/90000 /*360 video*/
a=3gpp_360video:102...
a=rtpmap:104 H265/90000 /*2D video*/
a=3gpp_overlay:100... /*optional attribute*/
a=mid=Y /*capture of B*/
m=video 49164 RTP/AVP 106 108
a=tcap:1 RTP/AVPF
a=pcfg:1 t=1
b=AS:950
b=RS:0
b=RR:5000
a=rtpmap:106 H265/90000 /*2D video*/
a=3gpp_overlay:100... /*optional attribute*/
a=rtpmap:108 H265/90000 /*3D video*/
a=3gpp_360video:108...
a=mid=Z
```

FIG.10

SDP OFFER a=itt4rt_group: D G H ; E F H ; H G I /*create multiple groups at MRF, each group between a different 360 video from a certain entity (source), and 2D videos from other entities (sources)/

/*360 video of 1st conference room of A*/
m=video 49144 RTP/AVP 98
a=tcap:1 RTP/AVPF
a=pcfg:1 t=1
b=AS:950
b=RS:0
b=RR:5000
a=content:main /*indicates this m-line is from the main source from the conference location*/
a=rtpmap:98 H265/90000 /*360 video*/
a=3gpp_360video:98...
a=mid=D /*2D video of 1st conference room of A*/
m=video 49154 RTP/AVP 100
a=tcap:1 RTP/AVPF
a=pcfg:1 t=1
b=AS:950
b=RS:0
b=RR:5000
a=content:main /*indicates this m-line is from the main source from the conference location*/
a=rtpmap:100 H265/90000 /*2D video*/
a=3gpp_overlay:100... /*optional attribute*/
a=mid=E /*360 video of 2nd conference room of A*/
m=video 49164 RTP/AVP 102
a=tcap:1 RTP/AVPF
a=pcfg:1 t=1
b=AS:950
b=RS:0
b=RR:5000
a=content:alt /*indicates this m-line is from an alt source from the conference location*/
a=rtpmap: 102 H265/90000 /*360 video*/
a=3gpp_360video:98...
a=mid=F

FIG.11A

```
SDP OFFER
/*2D video of 2^nd conference room of A*/
m=video 49174 RTP/AVP 104
a=tcap:1 RTP/AVPF
a=pcfg:1 t=1
b=AS:950
b=RS:0
b=RR:5000
a=content:alt /*indicates this m-line is from an alt source from the conference location*/
a=rtpmap:100 H265/90000 /*2D video*/
a=3gpp_overlay:104... /*optional attribute*/
a=mid=G /*2D video capture of B*/
m=video 49164 RTP/AVP 106
a=tcap:1 RTP/AVPF
a=pcfg:1 t=1
b=AS:950
b=RS:0
b=RR:5000
a=rtpmap:106 H265/90000 /*2D video*/
a=3gpp_overlay:100... /*optional attribute*/
a=mid=H /*3D capture of B*/
m=video 49164 RTP/AVP 108
a=tcap:1 RTP/AVPF
a=pcfg:1 t=1
b=AS:950
b=RS:0
b=RR:5000
a=rtpmap:108 H265/90000 /*3D video*/
a=3gpp_360video:108...
a=mid=I
```

FIG.11B

METHOD AND APPARATUS FOR SUPPORTING TELECONFERENCING AND TELEPRESENCE CONTAINING MULTIPLE 360 DEGREE VIDEOS

CROSS-REFERENCE TO RELATED APPLICATION(S)

This application is based on and claims priority under 35 U.S.C. § 119(a) of a Korean patent application number 10-2021-0041400, filed on Mar. 30, 2021, in the Korean Intellectual Property Office, the disclosure of which is incorporated by reference herein in its entirety.

BACKGROUND

1. Field

The disclosure relates to a method and an apparatus for supporting teleconferencing and telepresence containing multiple 360-degree videos.

2. Description of Related Art $5^{th}$ Generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ Generation (6G) mobile communication technologies (referred to as Beyond 5 G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple input—multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, artificial intelligence (AI)-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Following the pursuit of high resolution video multimedia (standard definition (SD), high definition (HD), ultra-high definition (UHD)), the next immersive experience in multimedia was namely 360 video (360-degree video). By capturing 360 degrees, a user is able to view in any direction he or she desires whilst viewing content. Although still using traditional 2-Dimensional (2D) video codecs for compression, the support of 360 video requires new technologies in the end-to-end workflow, including: multi-camera configuration capture to capture the 360 scene; stitching technologies to create one continuous 360 video; new formats to support such stitched, as well as pre-stitched 360 videos; media processing technologies in order to reduce redundancy of such formats (such as region-wise packing); new delivery protocols and mechanisms in order to increase the efficiency of contents delivery (such as viewport dependent delivery).

Although there is much work and research on the streaming of 360 videos, conversational services for 360 videos have not been considered in much detail. By using the existing infrastructure in 5G for conversational multimedia services using internet protocol (IP) Multimedia Subsystem (IMS), various forms of multimedia can be supported, albeit with additional parameters and procedures required for each new form of media and use case.

Main IMS based services are conversational services that place emphasis on the live requirements needed for the service characteristics. Such traditional services include voice (telephone) calls, video calls.

The above information is presented as background information only to assist with an understanding of the disclosure. No determination has been made, and no assertion is made, as to whether any of the above might be applicable as prior art with regard to the disclosure.

SUMMARY

Session Description Protocol (SDP) fields and attributes do not support the expression of multiple 360 videos from a single entity, or multiple 360 videos from multiple entities, such that the 360 videos and their alternative 2-Dimensional (2D) videos may be selected by a remote terminal in a manner that allows the remote terminal to receive either (360 video or 2D video from the same entity) or neither, depending on its preference.

Aspects of the disclosure are to address at least the above-mentioned problems and/or disadvantages and to provide at least the advantages described below. Accordingly, an aspect of the disclosure is to provide a $5^{th}$ Generation (5G) or $6^{th}$ Generation (6G) communication system for supporting a higher data transmission rate.

Additional aspects will be set forth in part in the description which follows and, in part, will be apparent from the description, or may be learned by practice of the presented embodiments.

In accordance with an aspect of the disclosure, a method of a first entity performing a media resource function (MRF) is provided. The method includes transmitting, to a second entity, a session description protocol (SDP) offer message associated with a conference providing a plurality of 360-degree videos, and receiving, from the second entity, an SDP answer message based on the SDP offer message.

In accordance with another aspect of the disclosure, a first entity performing a media resource function (MRF) is provided. The first entity includes a transceiver, and a controller configure to transmit, to a second entity, a session description protocol (SDP) offer message associated with a conference providing a plurality of 360-degree videos, and receive, from the second entity, an SDP answer message based on the SDP offer message.

In accordance with another aspect of the disclosure, a method of a first entity performing a media resource function (MRF) is provided. The method includes transmitting, to a second entity, a session description protocol (SDP) offer message for an SDP negotiation associated with a conference providing a plurality of 360-degree videos, and receiving, from the second entity, an SDP answer message, and wherein the SDP offer message includes a plurality of media descriptions for the plurality of 360-degree videos, and wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

In accordance with another aspect of the disclosure, a method of a second entity is provided. The method includes receiving, from a first entity performing a media resource function (MRF), a session description protocol (SDP) offer message for an SDP negotiation associated with a conference providing a plurality of 360-degree videos, generating an SDP answer message based on the SDP offer message, and receiving, to the first entity, the SDP answer message, and wherein the SDP offer message includes a plurality of media descriptions for the plurality of 360-degree videos, and wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

In accordance with another aspect of the disclosure, a first entity performing a media resource function (MRF) is provided. The first entity includes a transceiver, and a processor coupled with the transceiver and configured to transmit, to a second entity, a session description protocol (SDP) offer message for an SDP negotiation associated with a conference providing a plurality of 360-degree videos, and receive, from the second entity, an SDP answer message, and wherein the SDP offer message includes a plurality of media descriptions for the plurality of 360-degree videos, and wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

In accordance with another aspect of the disclosure, a second entity includes a transceiver, and a processor coupled with the transceiver and configured to receive, from a first entity performing a media resource function (MRF), a session description protocol (SDP) offer message for an SDP negotiation associated with a conference providing a plurality of 360-degree videos, generate an SDP answer message based on the SDP offer message, and receive, to the first entity, the SDP answer message, and wherein the SDP offer message includes a plurality of media descriptions for the plurality of 360-degree videos, and wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 shows a first embodiment of an SDP offer according to an embodiment of the disclosure;

FIG. 10 shows a second embodiment of an SDP offer according to an embodiment of the disclosure;

FIGS. 11A and 11B show a third embodiment of an SDP offer according to various embodiments of the disclosure;

Throughout the drawings, like reference numerals will be understood to refer to like parts, components, and structures.

DETAILED DESCRIPTION

Figure 1A:
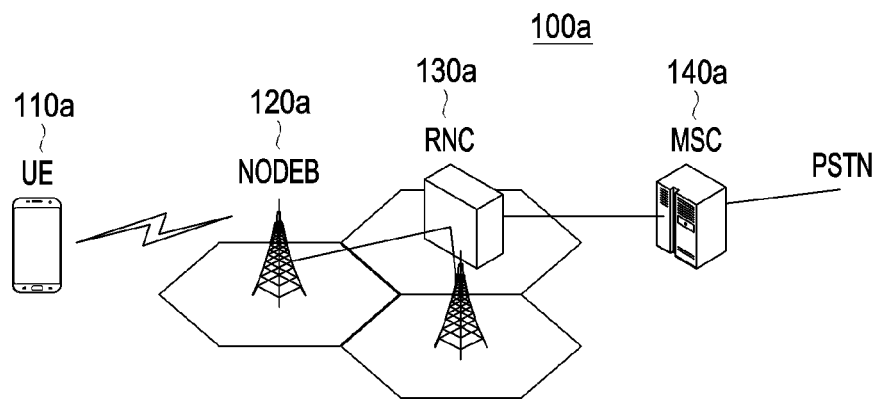
FIG. 1A shows a structure of a 3$^{rd}$ Generation (3G) network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure may relate to multimedia content processing authoring, pre-processing, post-processing, metadata delivery, delivery, decoding and rendering of, virtual reality, mixed reality and augmented reality contents, including two dimensional (2D) video, 360 video, three dimensional (3D) media represented by point clouds and meshes. The disclosure may also relate to virtual reality (VR) devices, eXtended Reality (XR) devices, session description protocol (SDP) negotiation. The disclosure may also relate to support of immersive teleconferencing and telepresence for remote terminals. The disclosure may also relate to conversational 360 video VR capture, processing, rendering, fetching, delivery, rendering.

Use cases:

The conference room contains multiple 360 videos (immersive video) which are captured by different cameras.

Remote conference participant(s) also may have 360 video capturing functionality.

As a combination of the two use cases:

There are multiple entities connected to a conference. In the disclosure, term multiple may be referred to plural.

One entity is a conference location (entity) which may have one or more 360 cameras (omnidirectional cameras), each representing a conference room.

Other entitie(s) are remote participant(s) which receive one or more 360 videos, and send (optionally) either 2D video or 3D video (360 video).

A Media Resource Function (MRF) (transmitter, Tx) is connected to each entity (receiver, Rx), and negotiates with each entity accordingly to negotiate the Immersive Teleconferencing and Telepresence for Remote Terminals (ITT4RT) session.

Each entity joins the conference through an SDP negotiation with the MRF, with SDP offers and answers.

Depending on the configurations of each participant to the ITT4RT conference, the MRF offers an SDP offer to each remote participant when s/he joins, with the remote participant terminal creating an SDP answer according to the contents in the SDP offer, and its preferred configurations as expressed in the SDP offer.

In order to support multiple 360 degree videos within an ITT4RT conference, several solutions for the creation of an SDP offer by the MRF are contained in this disclosure:

Solution 1:

When itt4rt_groups are not used, and SDP (offer) only contains multiple 360 video m-lines and 2D video m-line(s).

Each m-line contains either 360 video, 2D video, or both→both indicates that 3D/2D alternate views are offered by the entity source (for example, main (default) conference room, other conference room, or remote participant (user device)).

Conference room m-lines shall include the following payload formats in the following order: firstly 360 video, secondly 2D video, conference room m-line corresponding to m-line for media from the conference room).

Remote user (participant) m-lines shall include the payload formats in the following order: firstly 2D video, secondly 360 video (3D video), and remote user m-line corresponding to m-line for media from the remote user (participant).

By default, a remote user selects a 360 video of the conference location entity (the m-line with attribute a=content:main), specifically a default (main) conference room when there are multiple 360 video conference rooms. The source of the 360 video may be identified by the 'content' attribute (a=content:main).

Attribute a=content:main to signal main 360 video conference room, attribute a=content:alt to signal other 360 conference rooms. For example, the 360 video from the main default conference room shall include the 'content' attribute with its value set to 'main' (a=content:main) in the corresponding m-line. The 360 video from other conference rooms that are not the main default conference room shall the 'content' attribute with its value set to 'alt' (a=content:alt) in the corresponding m-line.

m-lines without content attribute a=content are from remote users. For example, the 360 video from other remote participants (user devices) shall not include the 'content' attribute (a=content) in the corresponding m-line.

Depending on its capability, a remote user may choose to receive multiple 360 videos.

m-lines for which 360 video is not selected is either set to receive 2D video, or not selected.

Solution 2:

One itt4rt_group is defined in the SDP. The itt4rt_group may be identified by itt4rt_group attribute. The itt4rt_group attribute may be used to restrict possible selection combination. In an embodiment, the itt4rt_group attribute may define one group using mIDs. In an embodiment, a list of mIDs in the itt4rt_group attribute may include at least one mID associated with 360-degree media and at least one mID associated with an overlay.

m-lines are same as in solution 1, but with attribute a=mid (attribute a=mid indicates a media line identifier (ID) (mID).

Each m-line contains either 360 video, 2D video, or both→both indicates that 3D/2D alternate views are offered.

Each m-line contains a mID (media line ID).

Conference room m-lines shall include the following payload formats in the following order: firstly 360 video, secondly 2D video.

Remote user m-lines shall include the payload formats in the following order: firstly 2D video, secondly 360 video.

By default, a remote user selects a 360 video of the conference location entity (the m-line with attribute a=content:main), specifically a default (main) conference room when there are multiple 360 video conference rooms. The source of the default (main) 360 video may be identified by the 'content' attribute (a=content:main).

Attribute a=content:main to signal main 360 video conference room, a=content:alt to signal other 360 conference rooms. For example, the 360 video from the main default conference room shall include the 'content' attribute with its value set to 'main' (a=content:main) in the corresponding m-line. The 360 video from other conference rooms that are not the main default conference room shall include the 'content' attribute with its value set to 'alt' (a=content:alt) in the corresponding m-line.

m-lines without content attribute a=content are from remote users. For example, the 360 video from other remote participants (user devices) shall not include the 'content' attribute (a=content) in the corresponding m-line.

Depending on its capability, a remote user may choose to receive multiple 360 videos.

m-lines for which 360 video is not selected is either set to receive 2D video, or not selected.

Solution 3:

Multiple itt4rt_groups are defined in the SDP. The multiple itt4rt_groups may be identified by itt4rt_group attribute.

Each m-line contains only either 360 video or 2D video, and not both.

Each m-line contains a mID.

Each itt4rt_group contains exactly one m-line with 360 video (360 m-line), and at least one m-line with 2D video.

A group containing a 360 m-line cannot contain an m-line with 2D video from the same source (the same entity source), for example, from the same conference room (when entity is a conference location) or from the same remote user (when entity is a remote user).

Conference location m-lines contain the content attribute, with m-lines representing default (main) conference room a=content:main, and others a=content:alt.

A remote user selects an itt4rt_group depending on the 360 m-line contained in the group, whether it is:

Default conference room: 360 m-line with a=content:main.

Non=default conference room: 360 m-line with a=content:alt.

A remote user 360 video (360 video from the remote user(participant)): 360 m-line with no content attribute a=content.

For the itt4rt_group selected by the remote user, 2D video m-lines may be received, in the following priority:

m-line with content:main or m-line without content attribute.

m-line with content:alt.

Uplink solution:

Rx remote users and conference rooms upload 360 video to MRF.

Together with 360 video, Rx may also upload an alternative 2D video to MRF.

Instead of alternative 2D video, Rx may upload 360 video together with viewport metadata which identifies the 2D video view to be extracted from the 360 video by the MRF.

Other aspects, advantages, and salient features of the disclosure will become apparent to those skilled in the art from the following detailed description, which, taken in conjunction with the annexed drawings, discloses various embodiments of the disclosure.

At least the following is disclosed by this disclosure.

A remote participant views one 360 video with his/her head mounted display (HMD), and other entities and/or conference rooms (where applicable) are viewed as 2D videos, which may be overlayed onto the 360 video.

The remote participant may switch 360 videos after the session is established.

FIG. 1A shows a structure of a 3G network according to an embodiment of the disclosure.

Referring to FIG. 1A, the 3G network 100*a* comprises a User Equipment (UE) 110*a*, an NodeB 120*a*, a Radio Network Controller (RNC) 130*a*, and a Mobile Switching Center (MSC) 140*a*. The 3G network 100*a* is connected to another mobile communication network and a public switched telephone network (PSTN). In such the 3G network 100*a*, voice is compressed/restored with an Adaptive Multi-Rate (AMR) codec, and the AMR codec is installed in a terminal (user equipment (UE)) 110*a* and MSC 140*a* to provide a two-way call service. The MSC 140*a* converts the voice compressed in the AMR codec into a Pulse Code Modulation (PCM) format and transmits it to the PSTN, or vice versa, transmits the voice in the PCM format from the PSTN, compresses it into the AMR codec, and transmits it to the base station (e.g., NodeB 120*a*). The RNC 130*a* can control the call bit rate of the voice codec installed in the UE 110*a* and MSC 140*a* in real time using the Codec Mode Control (CMC) message.

However, as a packet-switched network is introduced in $4^{th}$ Generation (4G) long term evolution (LTE), the voice codec is installed only in the terminal, and the voice frame compressed at intervals of 20 ms is not restored at the base station or the network node located in the middle of the transmission path and is transmitted to the counterpart terminal.

Figure 1B:
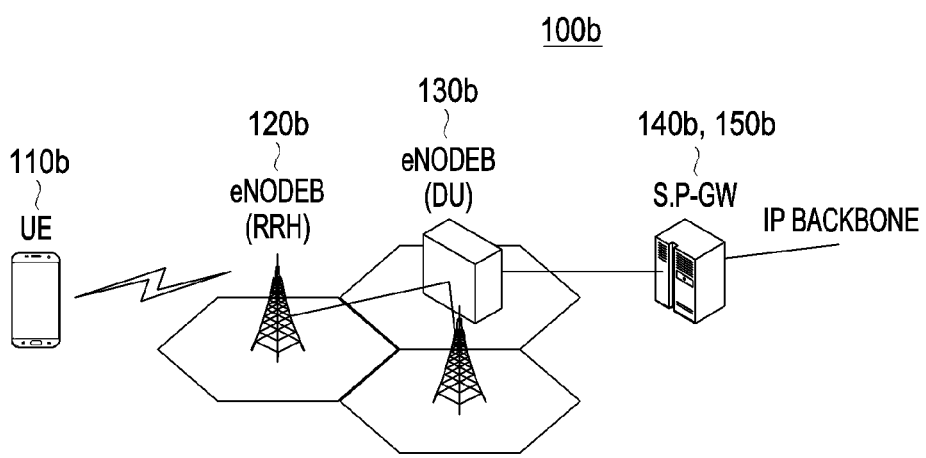
FIG. 1B shows a structure of a long term evolution (LTE) network according to an embodiment of the disclosure.

FIG. 1B shows a structure of a long term evolution (LTE) network according to an embodiment of the disclosure.

Referring to FIG. 1B, an LTE network (4G network) 100*b* includes a User Equipment (UE) 110*b*, an evolved NodeB (eNodeB, eNB) 120*b*, an eNodeB 130*b*, and Serving Gateway (S-GW)/Packet Data Network Gateway (P-GW) 140*b*, 150*b*.

In an embodiment of FIG. 1B, the voice codec is installed only in the UE 110*b*, and each terminal (UE) can adjust the voice bit rate of the counterpart terminal using a Codec Mode Request (CMR) message.

In an embodiment of FIG. 1B, the eNodeB 120*b*, 130*b*, which is a base station, is divided into a Remote Radio Head (RRH) (e.g., eNodeB 120*b*) dedicated to radio frequency (RF) functions and a Digital Unit (DU) (e.g., eNodeB 130*b*) dedicated to modem digital signal processing. The eNodeB 120*b*, 130*b* is connected to the internet protocol (IP) backbone network through the S-GW 140*b* and P-GW 150*b*. The IP backbone network is connected to the mobile communication network or Internet of other service providers.

Figure 2A:
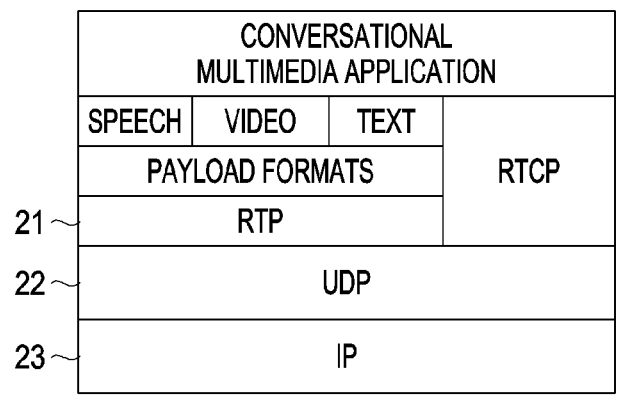
FIG. 2A shows a structure of a voice and video codec of a voice over long term evolution (VoLTE) supported terminal and a real time transport (RTP)/user datagram protocol (UDP)/internet protocol (IP) protocol according to an embodiment of the disclosure.

FIG. 2A shows a structure of a voice and video codec of a voice over LTE (VoLTE) supported terminal and a Realtime Transport (RTP) Protocol)/User Datagram Protocol (UDP)/IP (Internet Protocol) protocol according to an embodiment of the disclosure.

Referring to FIG. 2A, an IP protocol 23 located at the bottom of this structure is connected to the Packet Data Convergence Protocol (PDCP) located at the top of the protocol structure. In an embodiment of FIG. 2A, a media data (e.g., speech, video, text) is transmitted through RTP protocol 21/UDP protocol 22/IP protocol 23. The RTP/UDP/IP header is attached to the compressed media frame (media data) in the voice and video codec and transmitted to the counterpart terminal through the LTE network. In addition, the counterpart terminal receives the media packet (media data) compressed and transmitted from the network, restores the media, listens to the speaker and the display, and views the media. At this time, even if the compressed voice and video packet do not arrive at the same time, the Timestamp information of the RTP protocol header is used to synchronize the two media to listen and watch.

Figure 2B:
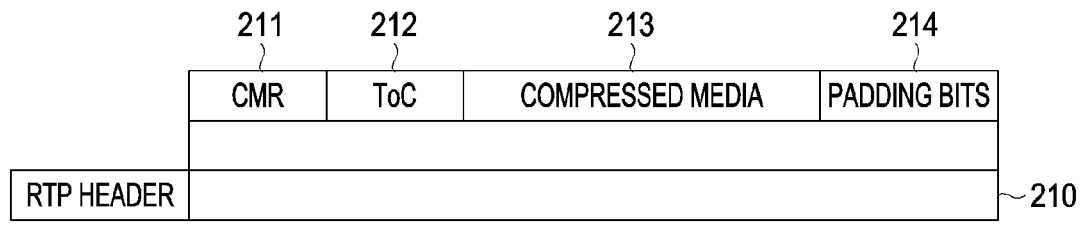
FIG. 2B shows a Codec Mode Request (CMR) message according to an embodiment of the disclosure.

FIG. 2B shows a CMR message according to an embodiment of the disclosure.

In an embodiment of FIG. 2B, the CMR message may be a message used for adjusting a bit rate in which a counterpart terminal compresses a voice according to a change in a transmission state during a call.

Referring to FIG. 2B, the part at the top of FIG. 2B corresponds to a Payload format 210 and includes Codec Mode Request (CMR) field 211, Table of Contents (ToC) field 212, compressed media field 213 including compressed media data and/or padding bits field 214 including padding bits.

In an embodiment of FIG. 2B, a 4-bit CMR field 211 is added to the compressed voice frame (compressed media data) in the voice codec indicated by Speech to display a bit rate requested to be used by the voice codec of the counterpart terminal, and a 4-bit ToC field is added thereto to indicate the bit rate and type of the frame (media data) compressed and transmitted. VoLTE supports voice codecs such as Adaptive Multi-Rate (AMR), Adaptive Multi-Rate Wideband (AMR-WB), and Enhanced Voice Services (EVS).

The CMR message may also be transmitted through the RTCP protocol in addition to the Payload protocol.

Figures 3, 4:
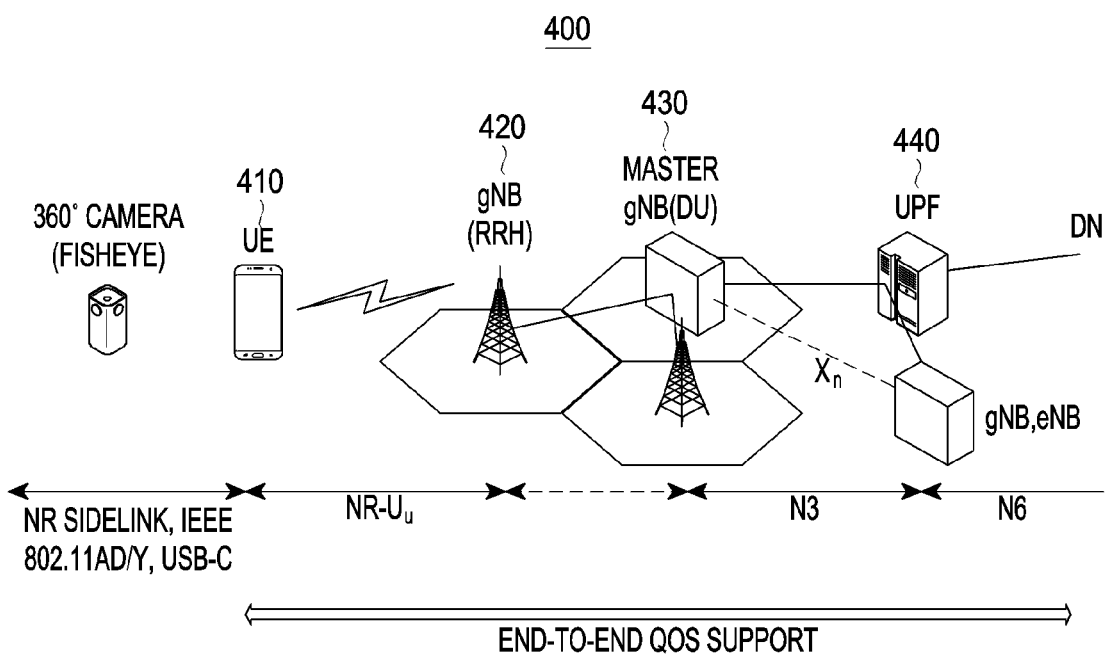
FIG. 3 shows a structure of a Temporary Maximum Media Bit-Rate Request (TMMBR) message according to an embodiment of the disclosure.
FIG. 4 shows a structure a 5$^{th}$ Generation (5G) network for transmitting fisheye circular image videos according to an embodiment of the disclosure.

FIG. 3 shows a structure of a Temporary Maximum Media Bit-Rate Request (TMMBR) message according to an embodiment of the disclosure.

Referring to FIG. 3, the TMMBR message may be included in the RTCP during a call to dynamically adjust the bit rate of an image codec installed in the counterpart terminal. In an embodiment, the TMMBR message includes Exp field 310 indicating a value of the Exp and Mantissa field 320 indicating a value of the Mantissa. The UE that receives this message maintains the bit rate of the compressed image below Mantissa×2Exp bps based on Exp field 310 and Mantissa field 320. This value should be equal to or less than the bit rate negotiated before starting the video call.

FIG. 4 shows a structure a 5G network for transmitting fisheye circular image videos according to an embodiment of the disclosure.

Referring to FIG. 4, fisheye circular image may be captured and generated by a 360 camera.

Referring to FIG. 4, a 5G network 400 may include a User Equipment (UE) 410, a next generation NodeB (gNodeB, gNB) 420, Master gNB 430 and User Plane Function (UPF) 440. In an embodiment, UE 410 may be connected with a 360 camera.

The 5G nodes corresponding to the eNodeB, S-GW, and P-GW of LTE are gNB (e.g., UE 410), UPF 440, and Data Network (DN). The fisheye circular image videos or 360 video may be transmitted through the Sidelink or Wi-Fi Direct of LTE, 5G using an unlicensed frequency band without passing through the base station (gNB) (e.g., UE 410) or directly to the terminal via a universal serial bus (USB)-C cable. When USB-C is used, a large amount of data can be transmitted at a low rate without error, the videos can be compressed on the terminal rather than the camera.

Figure 5:
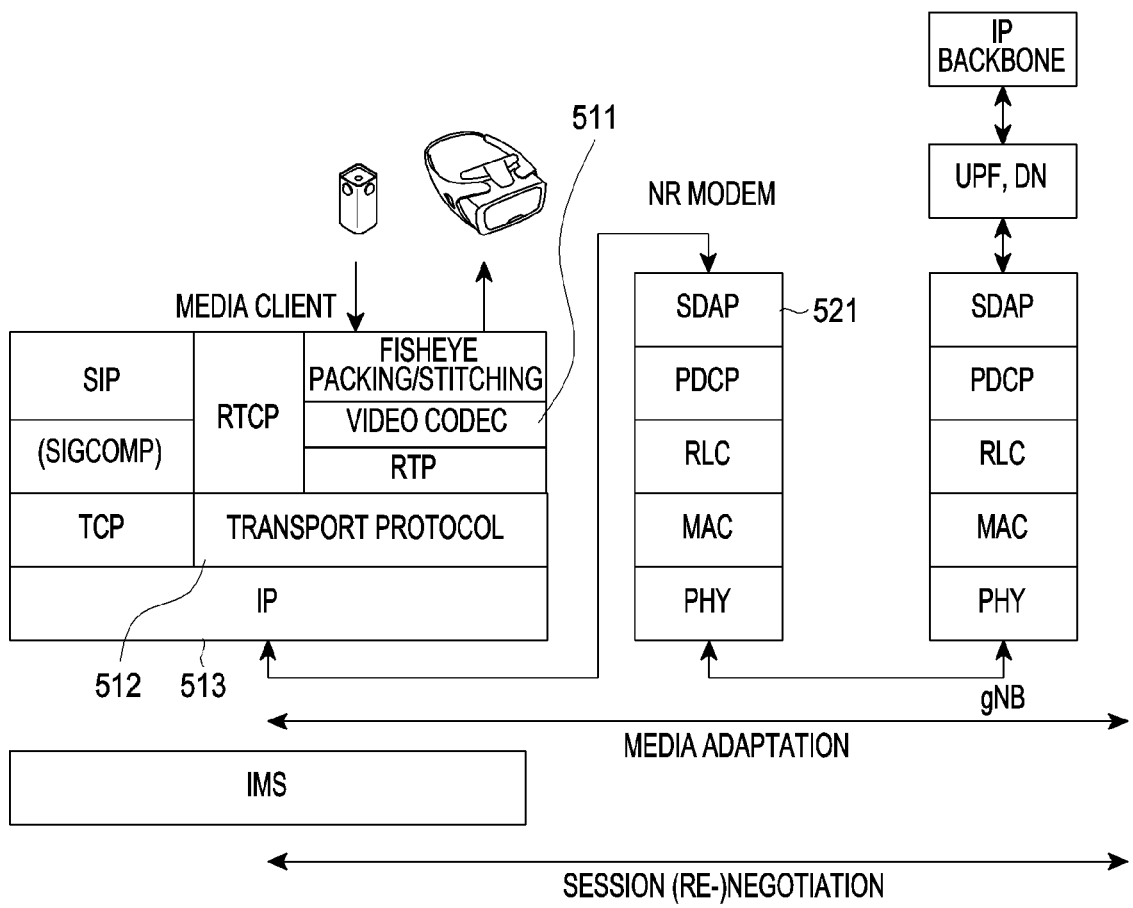
FIG. 5 shows a protocol architecture of a 5G network for transmitting 360 videos according to an embodiment of the disclosure.

FIG. 5 shows a protocol architecture of a 5G network for transmitting 360 videos according to an embodiment of the disclosure.

Referring to FIG. 5, the 360 videos may be a 360 image/video arrived at a transmitting terminal (device). In an embodiment, the transmitting terminal (device) may be the UE 410 of FIG. 5.

360 video is created by stitching, and possibly fisheye packing, and it is subsequently compressed using a video codec 511 (such as advanced video coding (AVC) or high efficiency video coding (HEVC)), and is delivered using various transport protocols 512 such as RTP and the Internet protocol 513, which includes the address of a receiving terminal, and is transmitted to a 5G New Radio (NR) modem and transmitted to a receiving terminal via uplink. Unlike the protocol structure of the LTE modem, the NR modem has a new protocol called Service Data Adaptation Protocol (SDAP) 521 located at the top of the PDCP.

The receiving terminal recovers the payload that has removed the headers of each protocol in the form of a compressed video stream which is fed into a video decoder, and then it is stitched (if necessary), and is projected onto a 3D sphere model, and the view matching the user's current viewport is rendered on the display such as a head mounted display (HMD) connected to the receiving terminal. The HMD may also not be connected to the terminal but may be connected directly to the mobile communication network using its own communication function.

Figure 6A:
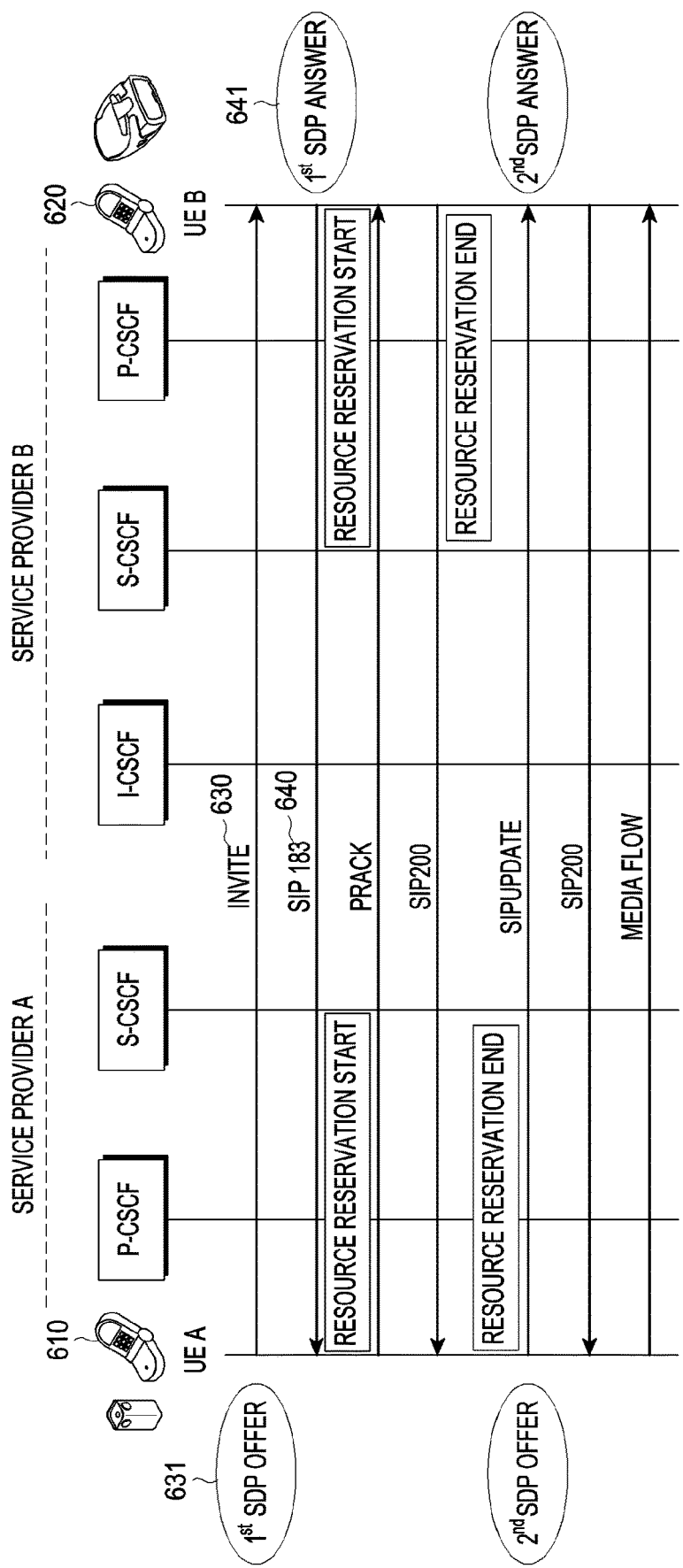
FIG. 6A shows a procedure for a transmitting terminal (e.g., a user equipment (UE)) (UE A) and a receiving terminal (UE B) to negotiate a transmission method of 360 video (for example, a fisheye camera based 360 video) using the IP multimedia subsystem and to secure the Quality of Service (QoS) of a wired and wireless transmission path according to an embodiment of the disclosure.

FIG. 6A shows a procedure for a transmitting terminal (UE A) and a receiving terminal (UE B) to negotiate a transmission method of 360 video (for example, a fisheye camera based 360 video) using the IP multimedia subsystem and to secure the QoS (Quality of Service) of a wired and wireless transmission path according to an embodiment of the disclosure.

In an embodiment of FIG. 6A, the IP multimedia subsystem (IMS) may be an IMS as shown in FIG. 5. In an embodiment of FIG. 6A, the transmitting terminal (e.g., UE A 610) and the receiving terminal (e.g., UE B 620) may perform a negotiation of parameter for a fisheye image/video (e.g., 360-degree fisheye circular image/video) using an SDP message (SDP offer message 631/SDP answer message 641). In other words, the SDP-based negotiation may be performed to negotiate parameter(s) for the fisheye image/video between the transmitting terminal (e.g., UE A 610) and the receiving terminal (e.g., UE B 620).

Referring to FIG. 6A, a transmitting terminal (e.g., UE A 610) may transmit the SDP request message (for example, SDP offer message) 631 to the Proxy Call Session Control Function (P-CSCF), which has an IMS node allocated to UE A 610, in the (SIP) Invite message 630. This message may be transmitted to the IMS connected to the counterpart terminal through nodes such as Session Call Session Control Function (S-CSCF) and Interrogating Call Session Control Function (I-CSCF) and finally to the receiving terminal (e.g., UE B 620).

The receiving terminal (e.g., UE B 620) may select an acceptable bit rate and the transmission method from among the bit rates proposed by the transmitting terminal (e.g., UE A 610). The receiving terminal may also select a desired configuration of 360 images/videos (e.g., fisheye circular images) according to that offered by the sending/transmitting terminal (e.g., UE A 610), including this information in an SDP answer message 641 in the SIP 183 message 640 in order to transmit the SDP answer message 641 to the transmitting terminal (e.g., UE A 610). In the process of transmitting the SDP answer message 641 to the transmitting terminal (e.g., UE A 610), each IMS node may start to reserve transmission resources of the wired and/or wireless networks required for this service, and all the conditions of a session including point cloud transmission may be agreed through additional procedures. The transmitting terminal (e.g., UE A 610) may confirm that the transmission resources of all transmission sections may be secured and transmit the 360 video/image to the receiving terminal (e.g., UE B 620).

Figure 6B:
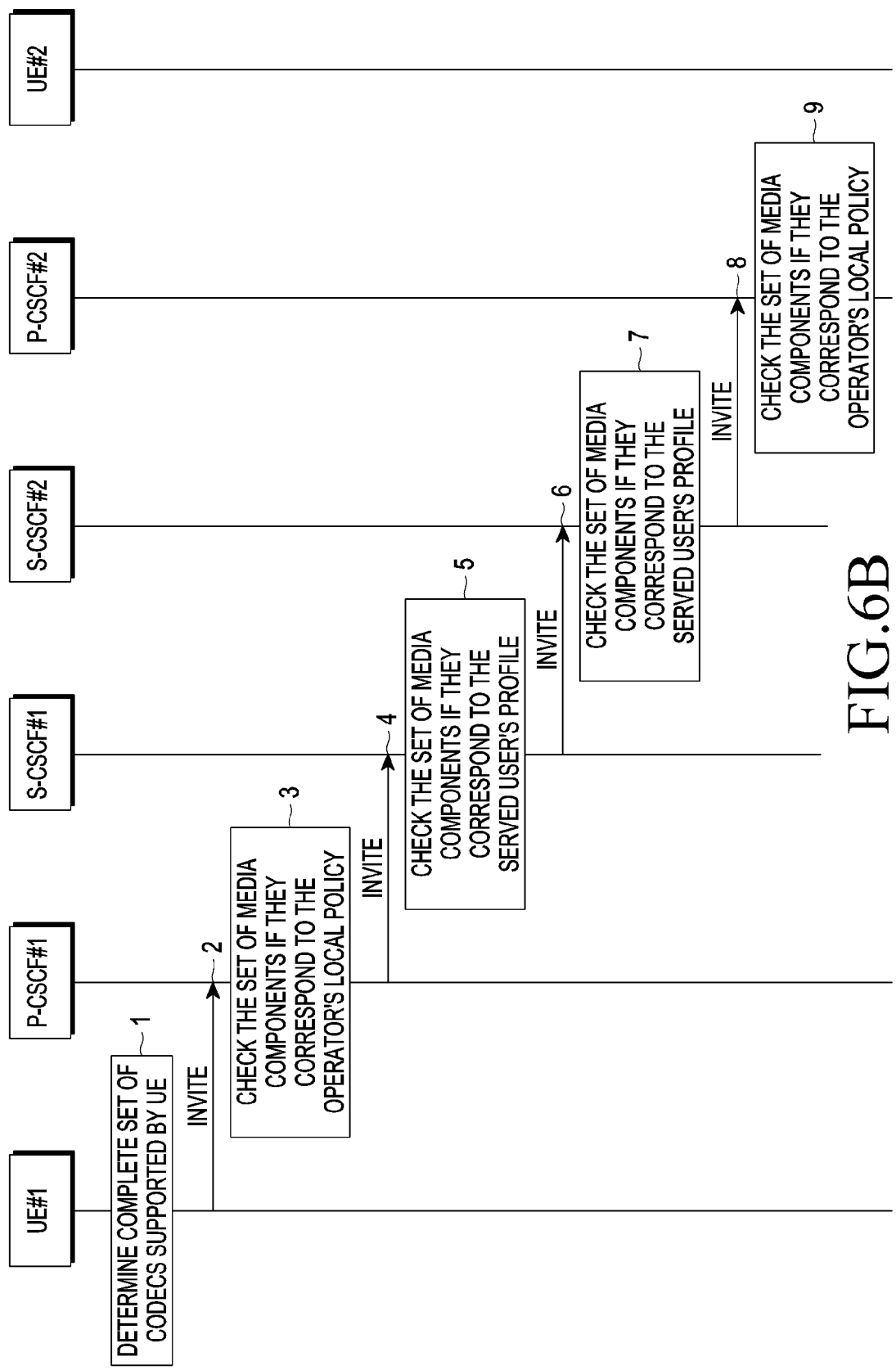
FIGS. 6B and 6C shows a procedure of the receiving terminal for establishing a session description protocol (SDP) answer from an SDP offer transmitted by the transmitting terminal according to various embodiments of the disclosure.
Figure 6C:
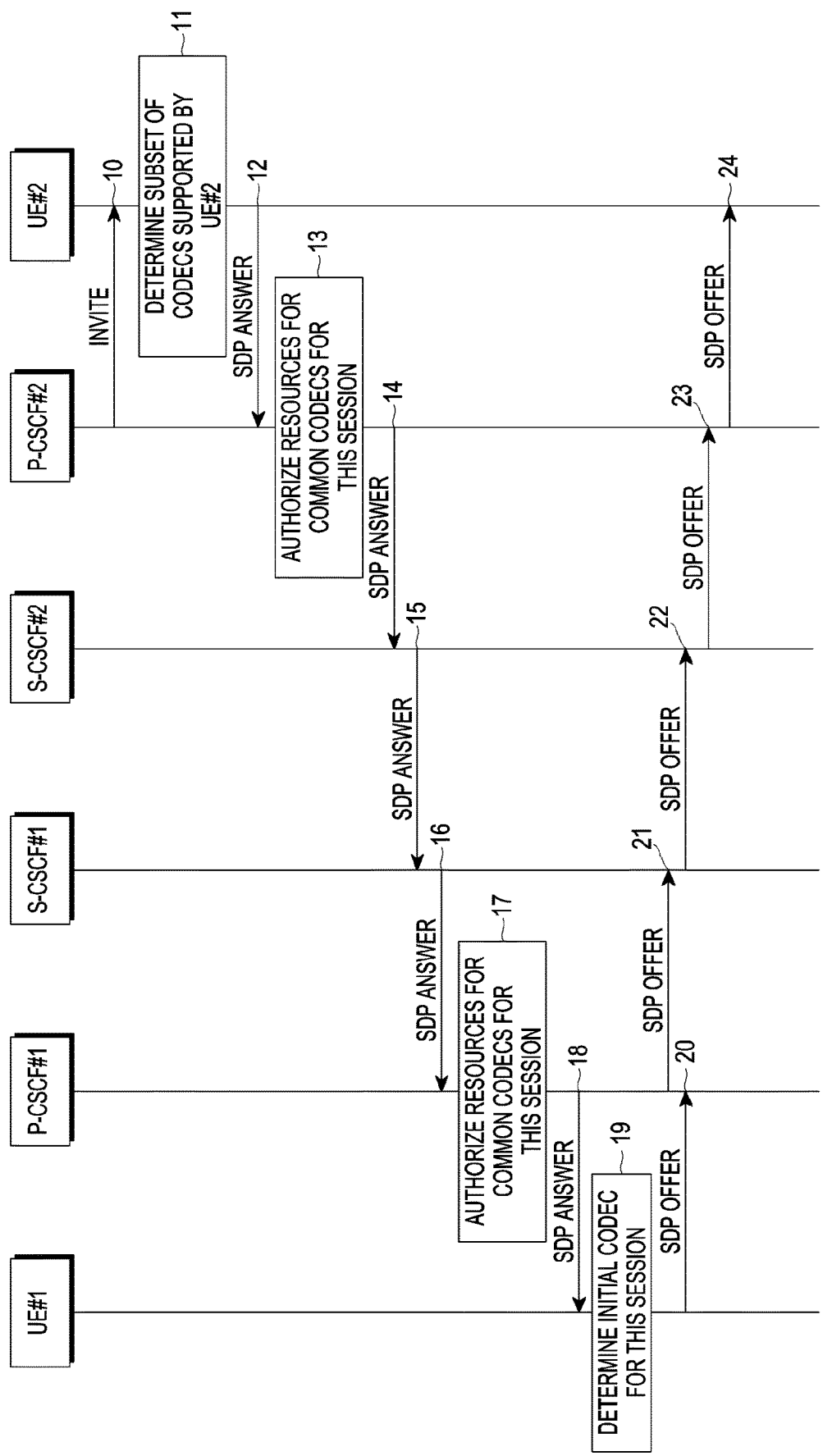

FIGS. 6B and 6C show a procedure of the receiving terminal for establishing an SDP answer from an SDP offer transmitted by the transmitting terminal according to various embodiments of the disclosure.

Referring to FIGS. 6B and 6C, the transmitting terminal may refer to a UE #1 and the receiving terminal may refer to a UE #2.

The detailed procedure may be as follows:

In operation 1, UE #1 inserts the codec(s) to an SDP payload. The inserted codec(s) shall reflect the UE #1's terminal capabilities and user preferences for the session capable of supporting for this session. The UE #1 builds an SDP (SDP offer) containing bandwidth requirements and characteristics of each, and assigns local port numbers for each possible media flow. Multiple media flows may be offered, and for each media flow (m=line in SDP), there may be multiple codec choices offered.

In operation 2, UE #1 sends the initial INVITE message to P-CSCF #1 containing this SDP.

In operation 3, P-CSCF #1 examines the media parameters (components). If P-CSCF #1 finds media parameters not allowed to be used within an IMS session (based on P-CSCF local policies, or if available bandwidth authorization limitation information coming from the PCRF/PCF), it rejects the session initiation attempt. This rejection shall contain sufficient information for the originating UE (e.g., UE #1) to re-attempt session initiation with media parameters that are allowed by local policy of P-CSCF #1's network according to the procedures specified in Internet Engineering Task Force (IETF) request for comments (RFC) 3261 [12]. In this flow described in FIG. 6B the P-CSCF #1 allows the initial session initiation attempt to continue.

NOTE 1: Whether the P-CSCF should interact with PCRF/PCF in this step is based on operator policy.

In operation 4, P-CSCF #1 forwards the INVITE message to S-CSCF #1.

In operation 5, S-CSCF #1 examines the media parameters (components). If S-CSCF #1 finds media parameters that local policy or the originating user's subscriber profile does not allow to be used within an IMS session, it rejects the session initiation attempt. This rejection shall contain sufficient information for the originating UE to re-attempt session initiation with media parameters that are allowed by the originating user's subscriber profile and by local policy of S-CSCF #1's network according to the procedures specified in IETF RFC 3261 [12]. In this flow described in FIG. 6B the S-CSCF #1 allows the initial session initiation attempt to continue.

In operation 6, S-CSCF #1 forwards the INVITE message, through the S-S Session Flow Procedures, to S-CSCF #2.

In operation 7, S-CSCF #2 examines the media parameters (components). If S-CSCF #2 finds media parameters that local policy or the terminating user's (e.g., UE #2) subscriber profile does not allow to be used within an IMS session, it rejects the session initiation attempt. This rejection shall contain sufficient information for the originating UE to re-attempt session initiation with media parameters that are allowed by the terminating user's subscriber profile and by local policy of S-CSCF #2's network according to the procedures specified in IETF RFC 3261 [12]. In this flow described in FIG. 6B the S-CSCF #2 allows the initial session initiation attempt to continue.

In operation 8, S-CSCF #2 forwards the INVITE message to P-CSCF #2.

In operation 9, P-CSCF #2 examines the media parameters (components). If P-CSCF #2 finds media parameters not allowed to be used within an IMS session (based on P-CSCF local policies, or if available bandwidth authorization limitation information coming from the PCRF/PCF), it rejects the session initiation attempt. This rejection shall contain sufficient information for the originating UE to re-attempt session initiation with media parameters that are allowed by local policy of P-CSCF #2's network according to the procedures specified in IETF RFC 3261 [12]. In this flow described in FIG. 6B the P-CSCF #2 allows the initial session initiation attempt to continue.

NOTE 2: Whether the P-CSCF should interact with PCRF/PCF in this step is based on operator policy.

In operation 10, P-CSCF #2 forwards the INVITE message to UE #2.

In operation 11, UE #2 determines the complete set of codecs that it is capable of supporting for this session. It determines the intersection with those appearing in the SDP (SDP offer) in the INVITE message. For each media flow that is not supported, UE #2 inserts an SDP entry for media (m=line) with port=0. For each media flow that is supported, UE #2 inserts an SDP entry with an assigned port and with the codecs in common with those in the SDP from UE #1.

In operation 12, UE #2 returns the SDP (SDP response/ SDP answer) listing common media flows and codecs to P-CSCF #2.

In operation 13, P-CSCF #2 authorizes the QoS resources for the remaining media flows and codec choices.

In operation 14, P-CSCF #2 forwards the SDP response/ answer to S-CSCF #2.

In operation 15, S-CSCF #2 forwards the SDP response/ answer to S-CSCF #1.

In operation 16, S-CSCF #1 forwards the SDP response/ answer to P-CSCF #1.

In operation 17, P-CSCF #1 authorizes the QoS resources for the remaining media flows and codec choices.

In operation 18, P-CSCF #1 forwards the SDP response/ answer to UE #1.

In operation 19, UE #1 determines which media flows should be used for this session, and which codecs should be used for each of those media flows. If there was more than one media flow, or if there was more than one choice of codec for a media flow, then UE #1 need to renegotiate the codecs by sending another offer to reduce codec to one with the UE #2.

In operation 20-24, UE #1 sends the "Offered SDP" message to UE #2, along the signalling path established by the INVITE request.

The remainder of the multi-media session completes identically to a single media/single codec session, if the negotiation results in a single codec per media.

Figure 7:
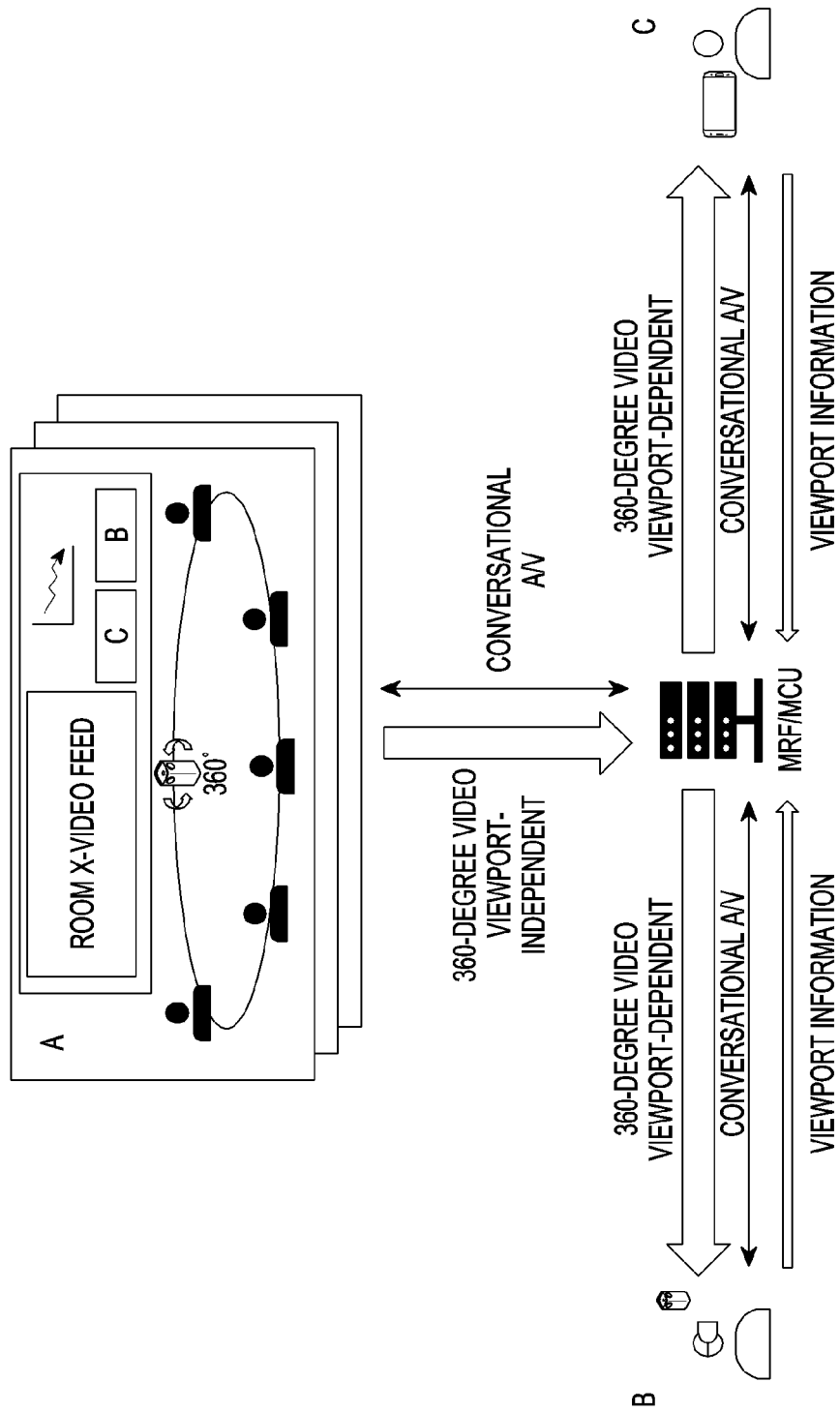
FIG. 7 shows an example of a conference scenario supported, according to an embodiment of the disclosure.

FIG. 7 shows an example of a conference scenario supported, according to an embodiment of the disclosure.

Referring to FIG. 7, an immersive teleconferencing and telepresence use case (for example, immersive teleconferencing and telepresence for remote terminals (ITT4RT) use case), "A" represents a conference location entity with multiple conference rooms, each with a 360 camera capturing 360 video (360-degree video). "B" and "C" are remote user entities, each of which has a remote terminal. In an embodiment, "B" may join the conference using an HMD, whilst C may join the conference using an electronic device such as a tablet, both viewing a 360-degree video of one of the 360 videos from "A", "B", and "C" may also have cameras which captures their self as 2D video. All entities may join the conference via an MRF/MCU (multimedia resource function/multipoint control unit) (for example, ITT4RT MRF), by way of an SDP negotiation exchange between the entity (for example, remote terminal/remote participant) and the MRF.

In the disclosure, the MRF or the ITT4RT MRF may be MTSI (multimedia telephony service for IMS) gateway supporting functionality for immersive teleconferencing and telepresence (for example, ITT4RT functionality). The ITT4RT MRF may be an ITT4RT client implemented by functionality included in the ITT4RT MRF. The ITT4RT MRF supporting immersive 360-degree video contains both ITT4RT-Tx and ITT4RT-Rx clients.

In the disclosure, the ITT4RT-Tx client may be an ITT4RT client only capable of sending immersive 360-degree video, and the ITT4RT-Rx client may be an ITT4RT client only capable of receiving immersive 360-degree video.

Figure 8:
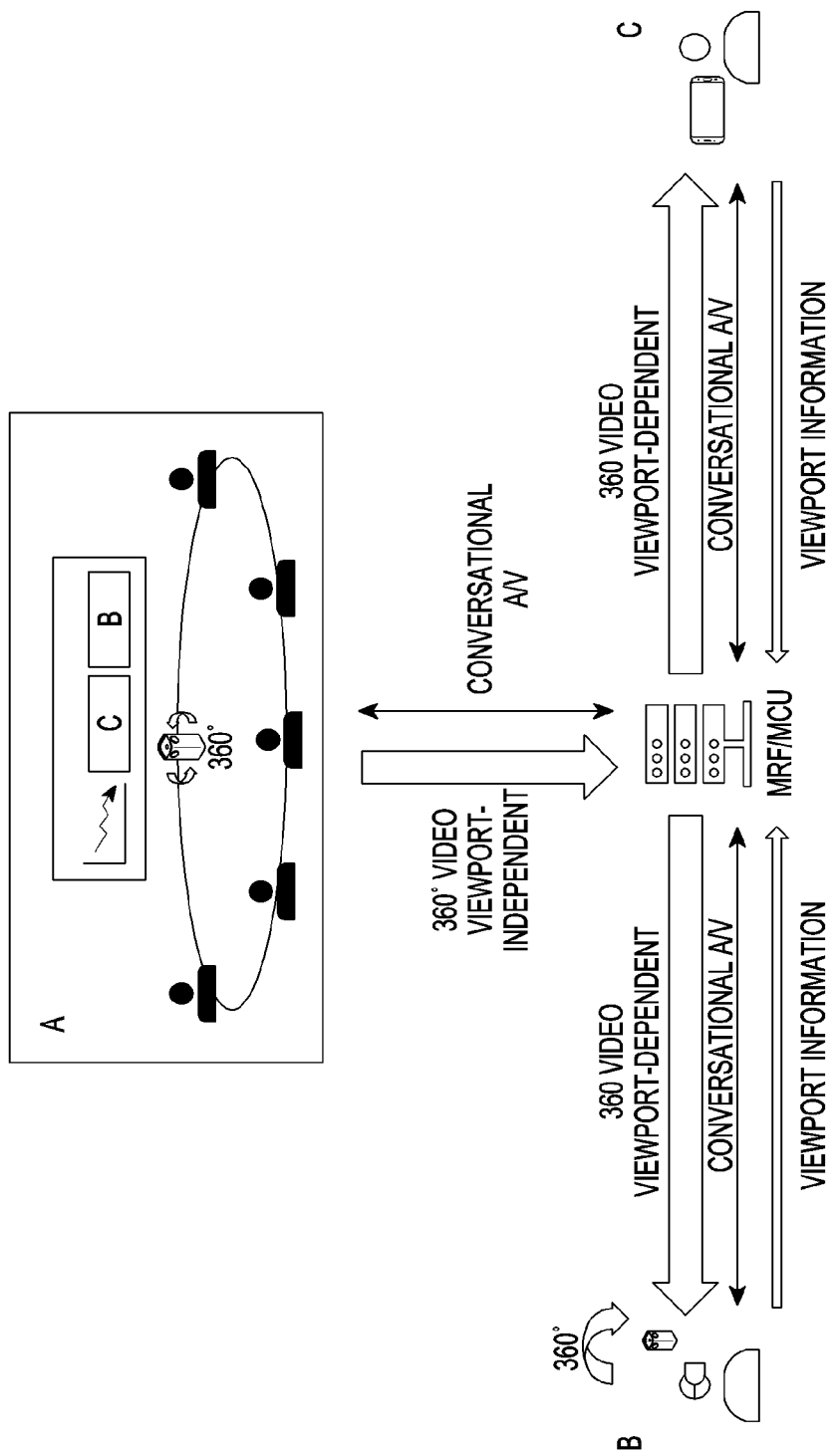
FIG. 8 shows another example of a conference scenario supported, according to an embodiment of the disclosure.

FIG. 8 shows another example of a conference scenario supported, according to an embodiment of the disclosure.

Referring to FIG. 8, in this variation, "B" may also have a 360 camera which captures his/her environment as a 360 video, which is sent to the MRF. As such, "A" and "C" may also view the 360 video of "B".

FIG. 9 shows a first embodiment of an SDP offer according to an embodiment of the disclosure.

The SDP offer (SDP offer message) may be created by the MRF, and sent from the MRF to a typical remote terminal ("C" in FIGS. 7 and 8), for the joint use case from those shown in FIGS. 7 and 8. Here, "A" may send multiple 360 videos (each from a different conference room) to the MRF, and "B" also may send a 360 video to the MRF. A 2D video capture of "B" may also be offered by the MRF to "C" in this offer (SDP offer), as shown, either created by the MRF, or also sent to the MRF by "B".

Each m-line represents (video) media from an entity source. Depending on the entity source, the MRF may offer in the SDP offer, different payload formats for the media from that entity source (for example, including both 360 video and normal 2D video under the m-line). In this disclosure, the m-line may be referred to a media description in the SDP, media stream or media line.

360 video may be indicated (or, identified) by the a=3gpp_360video attribute, or the a=3gpp_fisheye attribute, or by some other means. The attributes 3gpp_360video and 3gpp_fisheye may be a media line attribute (an attribute of media level) and used to indicate (or, identify) respectively a 360-degree projected video stream and a 360-degree fisheye video stream.

M-lines representing conference rooms of the conference location have the "a=content" content attribute included in order to indicate the conference location entity of this source. The "a=content" content attribute may be used to identify a source of the 360 video associated with the content attribute.

In an embodiment, the m-line representing the default (conference) room will have the "a=content:main" main content attribute under the m-line in order to indicate that it is the default conference room, and must contain an offer of 360 video. For example, in case that the 360 video is from main (default) conference room (in case that the 360 video is originated from main source at the conference location), the m-line associated with the 360 video includes the content attribute set to a value of 'main' ("a=content:main" main content attribute).

In an embodiment, other conference rooms which are not the main conference room, will have the "a=content:alt" alternative content attribute under the m-line in order to indicate that it is an alternative conference room. Alternative conference rooms may have an offer of 360 video, and/or normal 2D video. For example, in case that the 360 video is from other conference rooms that are not the main (default) conference room (in case that the 360 video is originated from alternative source at the conference location), the m-line associated with the 360 video includes the content attribute set to a value of 'alt' (the "a=content:alt" alternative content attribute).

In an embodiment, the m-line representing a remote participant will not have the "a=content" content attribute under the m-line in order to indicate that it is the remote participant other than the conference room. For example, in case that the 360 video is from other remote participants (user devices) that are not the conference room (in case that the 360 video is originated from a remote participant/terminal other than the conference location), the m-line associated with the 360 video does not include the content attribute set.

In this way, the content attribute a=content may be used to identify the main entity source, alternative entity source and/or other remote participant, and may be replaced with another attribute with the same functionality.

M-lines representing (video) media of other remote participants (entities) may also include either 360 video, or normal 2D video, or both.

Upon receiving the SDP offer from the MRF, the remote terminal (remote participant) is able to select one (or more) 360 videos for receipt on SDP negotiation, through its SDP answer. The remote terminal is also able to change the configuration of the session (SDP session) via a re-negotiation or SDP update.

FIG. 10 shows a second embodiment of an SDP offer according to an embodiment of the disclosure.

The SDP offer may be created by the MRF, and sent from the MRF to a typical remote terminal ("C" in FIGS. 7 and 8), for the joint use case from those shown in FIGS. 7 and 8. Here, "A" may send multiple 360 videos (each from a different conference room) to the MRF, and "B" may also send a 360 video to the MRF. A 2D video capture of "B" may also be offered by the MRF to "C" in this offer (SDP offer), as shown, either created by the MRF, or also sent to the MRF by "B".

Like the first embodiment of FIG. 9, each m-line represents (video) media from an entity source. Depending on the entity source, the MRF may offer in the SDP offer, different payload formats for the media from that entity source (for example, including both 360 video and normal 2D video under the m-line).

Each m-line contains a media ID (mID), as identified by a=mid attribute.

Through the use of the media ID, or another identifier, an ITT4RT group is created via the group attribute a=itt4rt_group, with the syntax:

a=itt4rt_group: <mid1>SP <mid2>SP <mid3> . . . .

The group attribute defines one group using mIDs. The list of mIDs in the group attribute includes at least one mID associated with 360-degree media and at least one mID associated with an overlay as defined by the mID attribute in the corresponding media description (m-line).

Referring to FIG. 10, in an embodiment, when there are multiple 360 videos from multiple sources, there may be multiple groups under the group attribute, with each group containing one mID associated with 360 video media, and other mID(s) associated with 2D video media from sources not corresponding to that of the 360 media source specified inside the group. These 2D video media may or may not be defined as overlays.

In an embodiment, the group attribute is located before m-lines associated with the group.

This group, as created by the MRF, includes all the m-lines as offered by the MRF in the SDP offer.

In this embodiment, selection of the different combinations of media lines, 360 videos and normal 2D videos from the different entities (conference participants) is fully flexible and up to the logic of the remote participant receiving this SDP offer.

A 360 video may be indicated (or, identified) by the a=3gpp_360video attribute, or the a=3gpp_fisheye attribute. The attributes 3gpp_360video and 3gpp_fisheye may be a media line attribute (an attribute of media level) and used to indicate (or, identify) respectively a 360-degree projected video stream and a 360-degree fisheye video stream.

M-lines representing conference rooms of the conference location have the "a=content" contents attribute included in order to indicate the conference location entity of this source. The "a=content" content attribute may be used to identify a source of the 360 video associated with the content attribute.

In an embodiment, the m-line representing the default (conference) room will have the "a=content:main" main content attribute under the m-line in order to indicate that it is the default conference room, and must contain an offer of 360 video. For example, in case that the 360 video is from main (default) conference room (in case that the 360 video is originated from main source at the conference location), the m-line associated with the 360 video includes the content attribute set to a value of 'main' ("a=content:main" main content attribute).

In an embodiment, other conference rooms which are not the main conference room, will have the "a=content:alt" alternative content attribute under the m-line in order to indicate that it is an alternative conference room. Alternative conference rooms may have an offer of 360 video, and or normal 2D video. For example, in case that the 360 video is from other conference rooms that are not the main (default) conference room (in case that the 360 video is originated from alternative source at the conference location), the m-line associated with the 360 video includes the content attribute set to a value of 'alt' (the "a=content:alt" alternative content attribute).

In an embodiment, the m-line representing a remote participant will not have the "a=content" content attribute under the m-line in order to indicate that it is the remote participant other than the conference room. For example, in case that the 360 video is from other remote participants (user devices) that are not the conference room (in case that the 360 video is originated from a remote participant/terminal other than the conference location), the m-line associated with the 360 video does not include the content attribute set.

M-lines representing (video) media of other remote participants (entities) may also include either 360 video, or normal 2D video, or both.

FIGS. 11A and 11B shows a third embodiment of an SDP offer according to various embodiments of the disclosure.

The SDP offer may be created by the MRF, and sent from the MRF to a typical remote terminal ("C" in FIGS. 7 and 8), for the joint use case from those shown in FIGS. 7 and 8. Here, "A" may send multiple 360 videos (each from a different conference room) to the MRF, and "B" may also send a 360 video to the MRF. A 2D video capture of "B" may also be offered by the MRF to "C" in this offer (SDP offer), as shown, either created by the MRF, or also sent to the MRF by "B".

Referring to FIGS. 11A and 11B, in this embodiment, unlike the first embodiment of FIG. 9 and second embodiment of FIG. 10, each m-line represents only one format (version) of the (video) media from an entity source. For example, an m-line will only contain either 360 video, or only normal 2D video, and not both under the same m-line.

Each m-line contains a media identifier (ID) (mID), as identified by a=mid attribute.

Through the use of the media IDs, ITT4RT groups are created via the group attribute a=itt4rt_group, with the syntax:

a=itt4rt_group: <mid1> SP <mid2>; SP <mid3>; . . . .

The group attribute defines one group using mIDs. The list of mIDs in the group attribute includes at least one mID associated with 360-degree media and at least one mID associated with an overlay as defined by the mID attribute in the corresponding media description (m-line).

In an embodiment, when there are multiple 360-degree (video) media from multiple sources, there may be multiple groups under the group attribute, with each group containing one mID associated with 360-degree (video) media, and other mID(s) associated with 2D video media from sources not corresponding to that of the 360 media source specified inside the group. These 2D video media may or may not be defined as overlays.

For example, multiple ITT4RT groups, as created by the MRF, each contains a set of media lines (as identified by their a=mid), containing one 360 video m-line from a certain entity source (conference room, or remote participant), together with normal 2D video m-line(s) from other entity source(s) (other conference rooms and/or remote participants which are not selected to be the 360 video in the ITT4RT group).

There are typically the same amount of ITT4RT groups as there are the number of m-lines representing 360 video from each entity source. The number of ITT4RT groups may be the same as the number of m-lines representing 360 video from each entity source.

In this embodiment, the MRF controls the set of media associated with a certain 360 video using the a=itt4rt_group attribute, and the remote participant receiving this SDP offer is only flexible in selecting which group to select, and also whether to receive the normal 2D videos in the selected group or not.

The default group which should be selected by the remote terminal is the group containing the m-line which also contains the a=3gpp_360video or a=3gpp_fisheye attributes (indicating that it is a 360 video), and which also contains the a=content:main attribute, indicating that it is content from the main conference room (main source) of the conference location (the main entity source of "A").

360 video may be indicated (or, identified) by the a=3gpp_360video attribute, or the a=3gpp_fisheye attribute. The attributes 3gpp_360video and 3gpp_fisheye may be a media line attribute (an attribute of media level) and used to indicate (or, identify) respectively a 360-degree projected video stream and a 360-degree fisheye video stream.

M-lines representing conference rooms of the conference location have the "a=content" contents attribute included in order to indicate the conference location entity of this source. The "a=content" content attribute may be used to identify a source of the 360 video associated with the content attribute.

In an embodiment, the m-lines representing the default (conference) room will have the "a=content:main" main content attribute under the m-lines in order to indicate that it is the default conference room, and can contain an offer of 360 video, or normal 2D video, depending on the m=line. For example, in case that the 360 video is from main (default) conference room (in case that the 360 video is originated from main source at the conference location), the m-line associated with the 360 video includes the content attribute set to a value of 'main' ("a=content:main" main content attribute).

In an embodiment, other conference rooms which are not the main conference room, will have the "a=content:alt" alternative content attribute under their m-lines in order to indicate that it is an alternative conference room. Alternative conference room m-lines may have an offer of 360 video, or normal 2D video. For example, in case that the 360 video is from other conference rooms that are not the main (default) conference room (in case that the 360 video is originated from alternative source at the conference location), the m-line associated with the 360 video includes the content attribute set to a value of 'alt' (the "a=content:alt" alternative content attribute).

In an embodiment, the m-line representing a remote participant will not have the "a=content" content attribute under the m-line in order to indicate that it is the remote participant other than the conference room. For example, in case that the 360 video is from other remote participants (user devices) that are not the conference room (in case that the 360 video is originated from a remote participant/terminal other than the conference location), the m-line associated with the 360 video does not include the content attribute set.

M-lines representing (video) media of other remote participants (entities) may include either 360 video, or normal 2D video, but not both.

Figure 12:
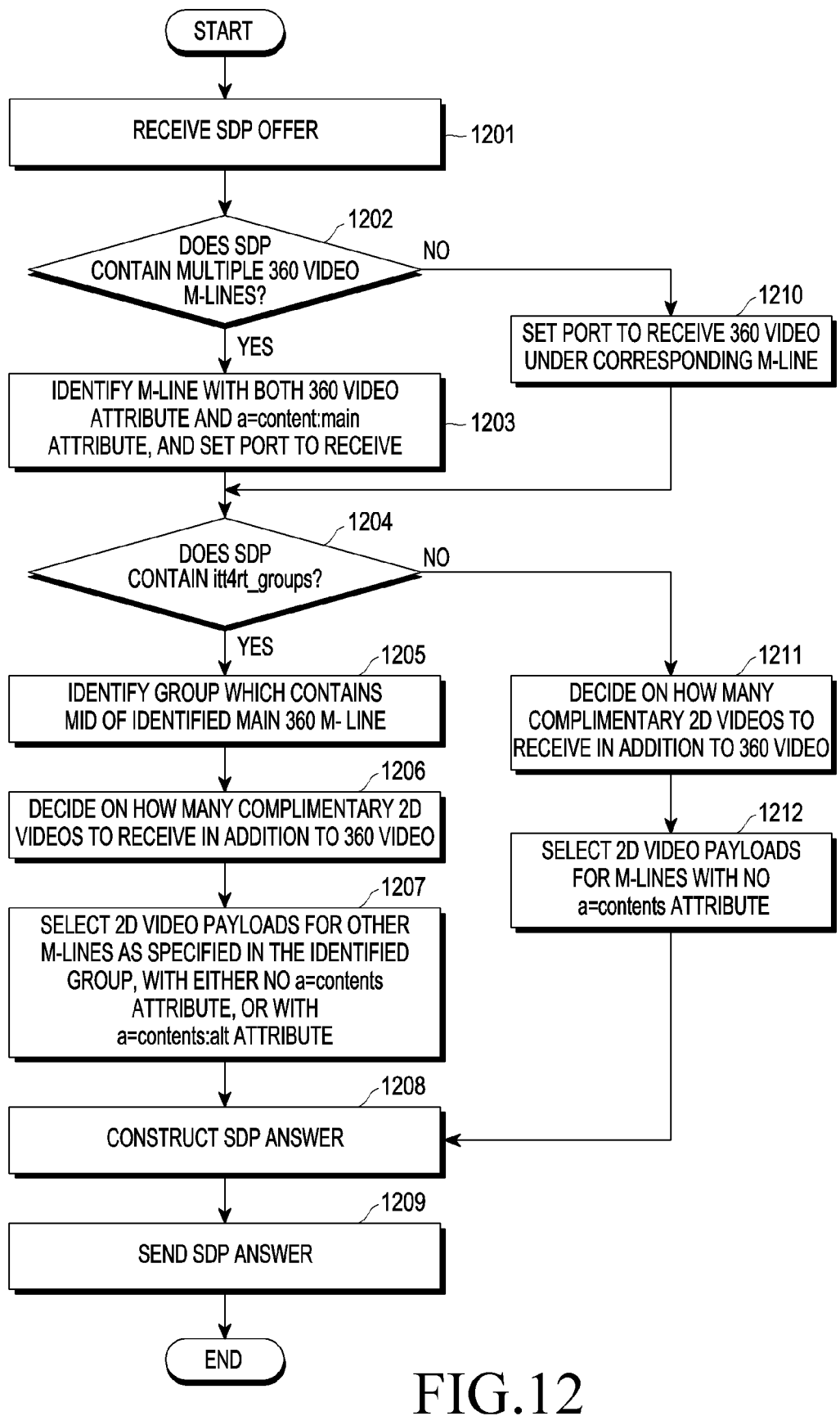
FIG. 12 shows the flow chart of constructing an SDP answer by a remote terminal, according to an embodiment of the disclosure.

FIG. 12 shows the flow chart of constructing an SDP answer by a remote terminal, according to an embodiment of the disclosure. The operations in the flow chart explicitly specified only consider the selection of downlink media streams by the remote terminal, and does not specify the uplink media stream(s) of the remote terminal to the MRF inside the SDP answer/response (this would be performed during the "Construct SDP Answer" step in FIG. 12).

As a minimum, the remote terminal should select the 360 video as indicated by the a=content:main attribute, but may also choose to receive more than one 360 video by also choosing to receive 360 video which corresponds to either an alternative conference room, or of a different remote participant.

Referring to FIG. 12, in operation 1201, the remote terminal may receive the SDP offer (SDP offer message). In an embodiment, the remote terminal may receive the SDP offer from the MRF. In an embodiment, the SDP offer is for example, one of the SDP offers of FIGS. 9 to 11A and 11B.

In operation 1202, the remote terminal may identify whether the SDP offer contains multiple 360 video m-lines.

In case that the SDP offer does not contain multiple 360 video m-lines, the remote terminal may set port to receive 360 video under corresponding m-line (operation 1210).

In case that the SDP offer contains multiple 360 video m-lines, the remote terminal may identify m-line with 360 video attribute (a=3gpp_360video attribute) and a=content: main attribute and set port to receive 360 video under corresponding m-line (operation 1203).

In operation 1204, the remote terminal may identify whether the SDP offer contains itt4rt_groups.

In case that the SDP offer does not contain itt4rt_groups, the remote terminal may decide on how many complimentary 2D videos to receive in addition to 360 video (operation 1211). The remote terminal may select 2D video payloads for m-lines with no a=content attribute (operation 1212).

In case that the SDP offer contains itt4rt_groups, the remote terminal may identify group which contains mID of the identified main 360 m-line (operation 1205). The remote terminal may decide on how many complimentary 2D videos to receive in addition to 360 video (operation 1206). The remote terminal may select 2D video payloads for other m-lines as specified in the identified group, with either no a=content attribute or with a=content:alt attribute (operation 1207).

In operation 1208, the remote terminal may construct SDP answer.

In operation 1209, the remote terminal may send SDP answer. In an embodiment, the remote terminal may send SDP answer to MRF.

Figure 13:
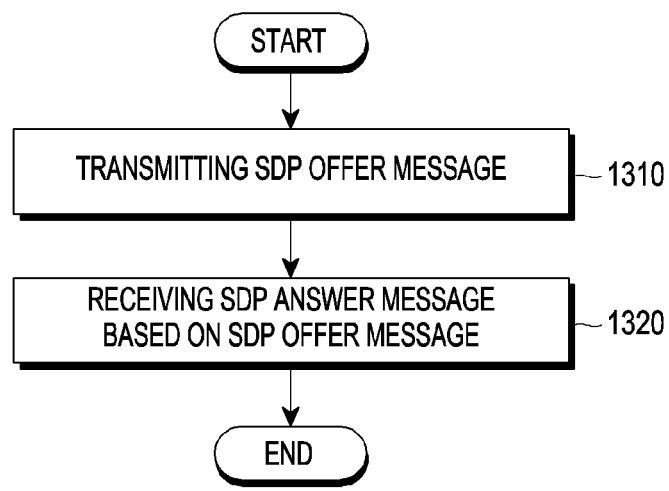
FIG. 13 shows the method of a first entity performing a media resource function (MRF), according to an embodiment of the disclosure.

FIG. 13 shows the method of a first entity performing a media resource function (MRF), according to an embodiment of the disclosure.

Referring to FIG. 13, the first entity transmits, to a second entity, a session description protocol (SDP) offer message associated with a conference providing a plurality of 360-degree videos (1310). In an embodiment, the first entity may be an ITT4RT MRF and the second entity may be a remote participant/terminal (user device).

The first entity receives, from the second entity, an SDP answer message based on the SDP offer message (1320).

In an embodiment, the SDP offer message includes a plurality of media descriptions for the plurality of 360-degree videos, and a first media description of the plurality of media descriptions includes a content attribute for identifying a source from which 360-degree video of a first media description is transmitted.

In an embodiment, in case that the 360-degree video of the first media description is transmitted from a main conference room of the conference, the first media description includes the content attribute set to a value indicating that the source is the main conference room, and in case that the 360-degree video of the first media description is transmitted from another conference room that is not the main conference room, the first media description includes the content attribute set to a value indicating that the source is the another conference room.

In an embodiment, a second media description of the plurality of media descriptions does not include a content attribute, in case that 360-degree video of the second media description is transmitted from a remote participant participating the conference.

In an embodiment, the SDP offer message includes a group attribute for defining at least one group, before the plurality of media descriptions, and each group is defined by using at least one media ID, each media Id identifying a corresponding media.

In an embodiment, in case that the plurality of 360-degree videos is from a plurality of sources and a plurality of groups is defined by the group attribute, the group attribute includes one media ID associated with 360-degree video and at least one other media ID associated with 2D video from at least one source not corresponding to a source of the 360-degree video.

In another embodiment, the first entity (MRF) may send to a remote participant an SDP offer containing a capability negotiation channel, as well as a set of media streams (m-lines) containing basic parameter information (such as codec, bitrate, port). The capability negotiation channel (such as a WebRTC datachannel) may be used by the MRF, to send to an application, the 360-video specific parameters defined in this disclosure (for example, related to identifying a source (a=content), restrictions on the combinations of media streams (itt4rt_group) etc.); these parameters may be sent in the form of an extensible markup language (XML) document, or similar. On receipt of the SDP offer containing such a capability negotiation channel, the remote participate may parse the information contained received through the capability negotiation channel and use this information in order to perform a re-negotiation with the first entity (MRF) (composing an SDP answer or SDP offer, one of, or a combination of those in FIGS. 9 to 11A and 11B) with the chosen such parameters contained in the relevant media streams (m-lines).

Figure 14:
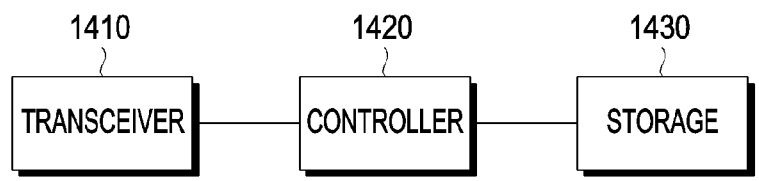
FIG. 14 is a block diagram of a first entity according to an embodiment of the disclosure.

FIG. 14 is a block diagram of a first entity according to an embodiment of the disclosure. The first entity may an entity corresponding to MRF/MCU of FIGS. 1A, 1B, 2A, 2B, 3, 4, 5, 6A, 6B, 6C, 7, 8, 9, 10, 11A, 11B, 12, and 13. For example, the first entity may be an ITT4RT MRF. The second entity may an entity corresponding to a remote participant (user device/terminal).

Referring to FIG. 14, the first entity may include a transceiver 1410, a controller 1420, and storage 1440. In the disclosure, the controller 1420 may include a circuit, an ASIC, or at least one processor.

The transceiver 1410 may transmit and receive signals to and from a terminal or another entity.

The controller 1420 may control the overall operation of the entity according to an embodiment. For example, the controller 1420 may control the signal flow to perform the operations in FIGS. 1A, 1B, 2A, 2B, 3, 4, 5, 6A, 6B, 6C, 7, 8, 9, 10, 11A, 11B, 12, and 13 described above. For example, the controller 1420 may transmit the SDP offer to the second entity and receive the SDP answer from the second entity.

In an embodiment, the controller 1420 may transmit, to a second entity, a session description protocol (SDP) offer message for an SDP negotiation associated with a conference providing a plurality of 360-degree videos.

In an embodiment, the controller 1420 may receive, from the second entity, an SDP answer message.

In an embodiment, the SDP offer message includes a plurality of media descriptions for the plurality of 360-degree videos.

In an embodiment, in case that a first 360-degree video of the plurality of 360-degree videos is originated from one of a plurality of sources at a conference location of the conference, a first media description for the first 360-degree video includes a content attribute for identifying a source from which the first 360-degree video is originated.

In an embodiment, in case that the first 360-degree video is originated from a main source at the conference location, the content attribute is set to a first value, and in case that the first 360-degree video is originated from another source other than the main source at the conference location, the content attribute is set to a second value.

In an embodiment, in case that the first 360-degree video is originated from a remote participant participating the conference other than the plurality of sources at the conference location, the first media description does not include the content attribute.

In an embodiment, the SDP offer message includes a group attribute for defining at least one group, and the group attribute includes at least one first media ID associated with a 360-degree video and at least one second media ID associated with at least one of 2D video or an overlay.

In an embodiment, each group is defined by using the at least one second media ID and one of the at least one first media ID.

In an embodiment, the group attribute is located before the plurality of media descriptions in the SDP offer message.

The storage 1430 may store at least one of information exchanged through the transceiver 1410 and information generated by the controller 1420.

Figure 15:
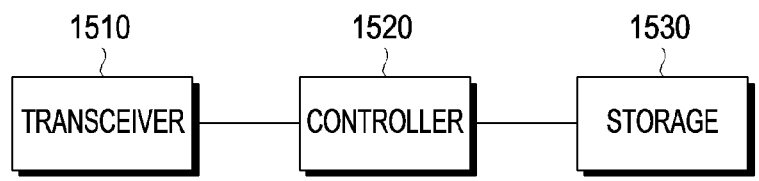
FIG. 15 is a block diagram of a second entity according to an embodiment of the disclosure.

FIG. 15 is a block diagram of a second entity according to an embodiment of the disclosure. The first entity may an entity corresponding to MRF/MCU of FIGS. 1A, 1B, 2A, 2B, 3, 4, 5, 6A, 6B, 6C, 7, 8, 9, 10, 11A, 11B, 12, and 13. For example, the first entity may be an ITT4RT MRF. The second entity may an entity corresponding to a remote participant (user device/terminal) or a conference location entity of FIGS. 1A, 1B, 2A, 2B, 3, 4, 5, 6A, 6B, 6C, 7, 8, 9, 10, 11A, 11B, 12, and 13.

Referring to FIG. 15, the second entity may include a transceiver 1510, a controller 1520, and storage 1530. In the disclosure, the controller 1520 may include a circuit, an application-specific integrated circuit (ASIC), or at least one processor.

The transceiver 1510 may transmit and receive signals to and from a terminal or another entity.

The controller 1520 may control the overall operation of the entity according to an embodiment. For example, the controller 1520 may control the signal flow to perform the operations in FIGS. 1A, 1B, 2A, 2B, 3, 4, 5, 6A, 6B, 6C, 7, 8, 9, 10, 11A, 11B, 12, and 13 described above. For example, the controller 1520 may receive the SDP offer from the first entity and transmit the SDP answer to the first entity.

In an embodiment, the controller 1520 may receive, from a first entity performing a media resource function (MRF), a session description protocol (SDP) offer message for an SDP negotiation associated with a conference providing a plurality of 360-degree videos.

In an embodiment, the controller 1520 may generate an SDP answer message based on the SDP offer message.

In an embodiment, the controller 1520 may transmit, to the first entity, the SDP answer message.

In an embodiment, the SDP offer message includes a plurality of media descriptions for the plurality of 360-degree videos.

In an embodiment, in case that a first 360-degree video of the plurality of 360-degree videos is originated from one of a plurality of sources at a conference location of the conference, a first media description for the first 360-degree video includes a content attribute for identifying a source from which the first 360-degree video is originated.

In an embodiment, in case that the first 360-degree video is originated from a main source at the conference location, the content attribute is set to a first value, and in case that the first 360-degree video is originated from another source other than the main source at the conference location, the content attribute is set to a second value.

In an embodiment, in case that the first 360-degree video is originated from a remote participant participating the conference other than the plurality of sources at the conference location, the first media description does not include the content attribute.

In an embodiment, the SDP offer message includes a group attribute for defining at least one group, and the group attribute includes at least one first media ID associated with a 360-degree video and at least one second media ID associated with at least one of 2D video or an overlay.

In an embodiment, each group is defined by using the at least one second media ID and one of the at least one first media ID.

In an embodiment, the group attribute is located before the plurality of media descriptions in the SDP offer message.

In an embodiment, only one 360-degree video of the plurality of 360-degree videos is selected to receive from the first entity.

The storage 1530 may store at least one of information exchanged through the transceiver 1510 and information generated by the controller 1520.

The definitions of terms below may be example definitions of terms used in the disclosure.

360-degree video: A real-world visual scene captured by a set of cameras or a camera device with multiple lenses and sensors covering the sphere in all directions around the center point of the camera set or camera device. The term 360-degree video may be used to include also limited 360-degree video.

Limited 360-degree video: A 360-degree video in which the visual scene does not cover the entire sphere around the center point of the camera set or camera device but only a part of it. A limited 360-degree video may be limited i) in the horizontal field to less than 360 degrees, or ii) in the vertical field to less than 180 degrees or iii) in both the vertical and horizontal fields.

Field of View: The extent of visible area expressed with vertical and horizontal angles, in degrees in the 3GPP 3DOF reference system as defined in TS 26.118.

Fisheye Video: Video captured by a wide-angle camera lens that usually captures an approximately hemispherical field of view and projects it as a circular image.

ITT4RT client: MTSI client supporting the Immersive Teleconferencing and Telepresence for Remote Terminals (ITT4RT) feature, as defined in Annex X.

ITT4RT-Tx client: ITT4RT client only capable of sending immersive video.

ITT4RT-Rx client: ITT4RT client only capable of receiving immersive video.

ITT4RT MRF: An ITT4RT client implemented by functionality included in the MRFC and the MRFP.

ITT4RT client in terminal: An ITT4RT client that is implemented in a terminal or UE. The term "ITT4RT client in terminal" is used in this document when entities such as ITT4RT MRF is excluded.

Omnidirectional media: Media such as image or video and its associated audio that allow rendering according to the user's viewing orientation, if consumed with a head-mounted device, or according to user's desired viewport, otherwise, as if the user was in the spot where and when the media was captured.

Overlay: A piece of visual media, rendered over omnidirectional video or image, or a viewport.

Pose: Position and rotation information associated to a viewport.

Projected picture: Picture that has a representation format specified by an omnidirectional video projection format.

Projection: Inverse of the process by which the samples of a projected picture are mapped to a set of positions identified by a set of azimuth and elevation coordinates on a unit sphere.

Viewport: Region of omnidirectional image or video suitable for display and viewing by the user.

In an embodiment of the disclosure, the following possible solutions may be provided to support multiple 360 video.

Identifying a 360 Video Under from a Multiple of 360 Video Media Streams.

360 video media are identified by either the a=3gpp_360video or a=3gpp_fisheye media line attributes.

When there are multiple 360 videos each from a different source, 360 videos from the conferencing location (conference rooms) shall include under its m-line the 'content' attribute.

A 360 video from the main default conference room shall include the 'content' attribute with its value set to 'main'.

A 360 video from other conference rooms that are not the main default conference room shall the 'content' attribute with its value set to 'alt'.

A 360 video from other remote participants (user devices) shall not include the 'content' attribute.

Use of the ITT4RT Group Attribute to Restrict Possible Selection Combinations.

The itt4rt_group attribute defines one group using mIDs, where the list of mIDs in the itt4rt_group shall include at least one mID associated with 360-degree media and at least one mID associated with an overlay as defined by the mID attribute in the corresponding media description.

When there are multiple 360 videos from multiple sources, there may be multiple groups under the itt4rt_group attribute, with each group containing one mID associated with 360-degree media, and other mIDs associated with 2D video media from sources not corresponding to that of the 360-degree media source specified inside the group. These 2D video media may or may not be defined as overlays.

An example ABNF syntax may be:
a=itt4rt_group: <mid1> SP <mid2> SP <mid3> SP; <mid4> SP <mid5> SP <mid6> SP; . . . .

Offering 2D Video from a 360 Video Source

When there are multiple 360 videos from different sources in the conference, a remote participant will typically receive only one 360 video from a given source at any given time. For other sources which also offer 360 video, an alternative 2D video media stream may also be offered in the SDP offer by the MRF/MCU. Such 2D video may be sent from the original source to the MRF/MCU, or may alternatively be created by the MRF/MCU from the original source 360 video.

When alternative 2D video is available from the MRF/MCU, this alternative 2D video may be included under the same media line as the 360 video from the same source (as a different format number/payload type), or as a separate media line altogether. When alternative 2D video from a 360 video conference room source is offered as a separate media line, these media lines shall also include the 'content' attribute with its value set to 'main' or 'alt', in accordance with the equivalent 360 video media lines.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a first entity performing a media resource function (MRF), the method comprising:
    transmitting, to a second entity, a session description protocol (SDP) offer message for an SDP negotiation associated with a conference providing a plurality of 360-degree videos; and
    receiving, from the second entity, an SDP answer message,
    wherein the SDP offer message includes a plurality of media descriptions for the plurality of 360-degree videos, and
    wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

2. The method of claim 1,
    wherein in case that the first 360-degree video is originated from a main source at the conference location, the content attribute is set to a first value, and
    wherein in case that the first 360-degree video is originated from another source other than the main source at the conference location, the content attribute is set to a second value.

3. The method of claim 1,
    wherein in case that the first 360-degree video is originated from a remote participant participating the conference other than the plurality of sources at the conference location, the first media description does not include the content attribute.

4. The method of claim 2,
wherein the SDP offer message includes a group attribute for defining at least one group, and
wherein the group attribute includes at least one first media identifier (ID) associated with a 360-degree video and at least one second media ID associated with at least one of 2-dimensional (2D) video or an overlay.

5. The method of claim 4, wherein each group is defined by using the at least one second media ID and one of the at least one first media ID.

6. The method of claim 4, wherein the group attribute is located before the plurality of media descriptions in the SDP offer message.

7. A method of a second entity, the method comprising:
receiving, from a first entity performing a media resource function (MRF), a session description protocol (SDP) offer message for an SDP negotiation associated with a conference providing a plurality of 360-degree videos;
generating an SDP answer message based on the SDP offer message; and
transmitting, to the first entity, the SDP answer message,
wherein the SDP offer message includes a plurality of media descriptions for the plurality of 360-degree videos, and
wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

8. The method of claim 7,
wherein in case that the first 360-degree video is originated from a main source at the conference location, the content attribute is set to a first value, and
wherein in case that the first 360-degree video is originated from another source other than the main source at the conference location, the content attribute is set to a second value.

9. The method of claim 8,
wherein in case that the first 360-degree video is originated from a remote participant participating the conference other than the plurality of sources at the conference location, the first media description does not include the content attribute.

10. The method of claim 8,
wherein the SDP offer message includes a group attribute for defining at least one group, and
wherein the group attribute includes at least one first media ID associated with a 360-degree video and at least one second media ID associated with at least one of 2-dimensional (2D) video or an overlay.

11. The method of claim 10, wherein each group is defined by using the at least one second media ID and one of the at least one first media ID.

12. The method of claim 10, wherein the group attribute is located before the plurality of media descriptions in the SDP offer message.

13. The method of claim 7, wherein only one 360-degree video of the plurality of 360-degree videos is selected to receive from the first entity.

14. A first entity performing a media resource function (MRF), the first entity comprising:
a transceiver; and
a processor coupled with the transceiver and configured to:
transmit, to a second entity, a session description protocol (SDP) offer message for an SDP negotiation associated with a conference providing a plurality of 360-degree videos, and
receive, from the second entity, an SDP answer message,
wherein the SDP offer message includes a plurality of media descriptions for the plurality of 360-degree videos, and
wherein, in case that a first 360-degree video of the plurality of 360-degree videos is originated from one of a plurality of sources at a conference location of the conference, a first media description for the first 360-degree video includes a content attribute for identifying a source from which the first 360-degree video is originated.

15. The first entity of claim 14,
wherein in case that the first 360-degree video is originated from a main source at the conference location, the content attribute is set to a first value, and
wherein in case that the first 360-degree video is originated from another source other than the main source at the conference location, the content attribute is set to a second value.

16. The first entity of claim 14,
wherein in case that the first 360-degree video is originated from a remote participant participating the conference other than the plurality of sources at the conference location, the first media description does not include the content attribute.

17. The first entity of claim 14,
wherein the SDP offer message includes a group attribute for defining at least one group,
wherein the group attribute includes at least one first media identifier (ID) associated with a 360-degree video and at least one second media ID associated with at least one of 2-dimensional (2D) video or an overlay,
wherein each group is defined by using the at least one second media ID and one of the at least one first media ID, and
wherein the group attribute is located before the plurality of media descriptions in the SDP offer message.

18. A second entity comprising:
a transceiver; and
a processor coupled with the transceiver and configured to:
receive, from a first entity performing a media resource function (MRF), a session description protocol (SDP) offer message for an SDP negotiation associated with a conference providing a plurality of 360-degree videos,
generate an SDP answer message based on the SDP offer message, and
transmit, to the first entity, the SDP answer message,
wherein the SDP offer message includes a plurality of media descriptions for the plurality of 360-degree videos, and
wherein, in case that a first 360-degree video of the plurality of 360-degree videos is originated from one of a plurality of sources at a conference location of the conference, a first media description for the first 360- degree video includes a content attribute for identifying a source from which the first 360-degree video is originated.

19. The second entity of claim 18,
wherein in case that the first 360-degree video is originated from a main source at the conference location, the content attribute is set to a first value, and
wherein in case that the first 360-degree video is originated from another source other than the main source at the conference location, the content attribute is set to a second value.

20. The second entity of claim 18,
wherein the SDP offer message includes a group attribute for defining at least one group,
wherein the group attribute includes at least one first media identifier (ID) associated with a 360-degree video and at least one second media ID associated with at least one of 2-dimensional (2D) video or an overlay,
wherein each group is defined by using the at least one second media ID and one of the at least one first media ID, and
wherein the group attribute is located before the plurality of media descriptions in the SDP offer message.

\* \* \* \* \*